US009763396B2

(12) United States Patent
Endrizzi et al.

(10) Patent No.: US 9,763,396 B2
(45) Date of Patent: Sep. 19, 2017

(54) DURATION CONTROL WITHIN IRRIGATION PROTOCOLS

(71) Applicant: Skydrop, LLC, Highland, UT (US)

(72) Inventors: Clark Endrizzi, Sandy, UT (US); Matt Romney, Alpine, UT (US); Mack Dalley, Alpine, UT (US); Robert Mars, Superior, CO (US)

(73) Assignee: Skydrop Holdings, LLC, Highland, UT (US)

( * ) Notice: Subject to any disclaimer, the term of this patent is extended or adjusted under 35 U.S.C. 154(b) by 418 days.

(21) Appl. No.: 14/315,263

(22) Filed: Jun. 25, 2014

(65) Prior Publication Data

US 2015/0005961 A1    Jan. 1, 2015

Related U.S. Application Data

(60) Provisional application No. 61/924,154, filed on Jan. 6, 2014, provisional application No. 61/841,828, filed on Jul. 1, 2013.

(51) Int. Cl.
| | |
|---|---|
| *G05D 11/00* | (2006.01) |
| *A01G 25/16* | (2006.01) |
| *G05B 15/02* | (2006.01) |
| *G05B 19/042* | (2006.01) |
| *G05D 7/06* | (2006.01) |

(52) U.S. Cl.
CPC ........... *A01G 25/165* (2013.01); *G05B 15/02* (2013.01); *G05B 19/042* (2013.01); *G05D 7/0664* (2013.01); *G05B 2219/25056* (2013.01); *G05B 2219/25205* (2013.01); *G05B 2219/2625* (2013.01); *G05B 2219/31422* (2013.01); *G05B 2219/32126* (2013.01)

(58) Field of Classification Search
None
See application file for complete search history.

(56) References Cited

U.S. PATENT DOCUMENTS

| | | | |
|---|---|---|---|
| 5,173,855 A | 12/1992 | Nielsen et al. | |
| 5,337,957 A | 8/1994 | Olson | |
| 5,479,339 A | 12/1995 | Miller | |
| 6,314,340 B1 * | 11/2001 | Mecham | A01G 25/167 239/69 |
| 6,823,239 B2 * | 11/2004 | Sieminski | A01G 25/167 239/69 |
| 7,058,478 B2 | 6/2006 | Alexanian | |
| 7,266,428 B2 | 9/2007 | Alexanian | |
| 7,567,858 B1 | 7/2009 | Dunlap | |
| 7,865,907 B2 | 1/2011 | Opheim | |
| 7,899,580 B2 | 3/2011 | Cardinal et al. | |
| 8,160,750 B2 * | 4/2012 | Weiler | A01G 25/16 239/69 |
| 8,209,061 B2 | 6/2012 | Palmer et al. | |

(Continued)

FOREIGN PATENT DOCUMENTS

WO    2013012826 A1    1/2013

*Primary Examiner* — Ronald Hartman, Jr.
(74) *Attorney, Agent, or Firm* — Terrence J. Edwards; TechLaw Ventures, PLLC

(57) ABSTRACT

The disclosure extends to methods, systems, and computer program products for generating and optimizing irrigation protocols. The disclosure also extends to methods, systems and computer program products for providing automated irrigation.

41 Claims, 12 Drawing Sheets

(56) References Cited

U.S. PATENT DOCUMENTS

| | | |
|---|---|---|
| 8,225,810 B2 | 7/2012 | Blanchard |
| 8,401,705 B2 | 3/2013 | Alexanian |
| 8,494,683 B2 * | 7/2013 | Piper .................... A01G 25/16 239/69 |
| 8,538,592 B2 | 9/2013 | Alexanian |
| 8,643,495 B2 | 2/2014 | Lan et al. |
| 8,874,764 B2 * | 10/2014 | Scott .................... H04W 48/18 709/221 |
| 8,930,032 B2 * | 1/2015 | Shupe .................... A01G 25/16 239/11 |
| 2003/0093159 A1 | 5/2003 | Sieminski |
| 2003/0208306 A1 | 11/2003 | Addink et al. |
| 2004/0063446 A1 | 4/2004 | Kennett |
| 2004/0089164 A1 | 5/2004 | Addink et al. |
| 2005/0082382 A1 | 4/2005 | Evelyn-Veere |
| 2005/0187666 A1 | 8/2005 | Marian |
| 2006/0027676 A1 | 2/2006 | Buck et al. |
| 2006/0116791 A1 | 6/2006 | Ravula et al. |
| 2006/0293797 A1 | 12/2006 | Weiler |
| 2007/0088462 A1 | 4/2007 | Peleg |
| 2007/0130093 A1 | 6/2007 | Haji-Valizadeh |
| 2007/0293990 A1 | 12/2007 | Alexanain |
| 2008/0027587 A1 | 1/2008 | Nickerson et al. |
| 2008/0154437 A1 | 6/2008 | Alexanian |
| 2009/0076660 A1 | 3/2009 | Goldberg et al. |
| 2009/0099701 A1 * | 4/2009 | Li .................... A01G 25/16 700/284 |
| 2009/0171328 A1 | 7/2009 | Horvath |
| 2009/0212966 A1 | 8/2009 | Panduro |
| 2009/0216345 A1 | 8/2009 | Christfort |
| 2009/0281672 A1 | 11/2009 | Pourzia |
| 2009/0326723 A1 | 12/2009 | Moore et al. |
| 2010/0010682 A1 | 1/2010 | Cardinal et al. |
| 2010/0038440 A1 | 2/2010 | Ersavas |
| 2010/0106337 A1 | 4/2010 | Sacks |
| 2010/0179701 A1 | 7/2010 | Gilbert et al. |
| 2011/0035059 A1 | 2/2011 | Ersavas |
| 2011/0106320 A1 | 5/2011 | Hall |
| 2011/0169659 A1 | 7/2011 | Dalla et al. |
| 2011/0238847 A1 | 9/2011 | Scott et al. |
| 2011/0270448 A1 | 11/2011 | Kantor et al. |
| 2011/0303311 A1 | 12/2011 | Klicpera |
| 2012/0095604 A1 | 4/2012 | Alexanian |
| 2012/0109387 A1 | 5/2012 | Martin et al. |
| 2012/0239211 A1 | 9/2012 | Walker et al. |
| 2012/0259473 A1 | 10/2012 | Nickerson et al. |
| 2012/0290140 A1 | 11/2012 | Groeneveld |
| 2012/0303168 A1 | 11/2012 | Halahan et al. |
| 2012/0322384 A1 | 12/2012 | Zerr et al. |
| 2013/0035774 A1 | 2/2013 | Warren et al. |
| 2013/0048746 A1 | 2/2013 | Littrell |
| 2013/0060389 A1 | 3/2013 | Marsters et al. |
| 2013/0085619 A1 | 4/2013 | Howard |
| 2013/0099022 A9 | 4/2013 | Palmer et al. |
| 2013/0110293 A1 * | 5/2013 | Illig .................... A01G 25/16 700/284 |
| 2013/0131874 A1 | 5/2013 | Shupe et al. |
| 2013/0226357 A1 | 8/2013 | Ersavas et al. |
| 2013/0310992 A1 | 11/2013 | Larsen |
| 2014/0039696 A1 | 2/2014 | Andrews |
| 2014/0039697 A1 | 2/2014 | Weiler et al. |
| 2015/0005958 A1 | 1/2015 | Endrizzi et al. |
| 2015/0005959 A1 | 1/2015 | Endrizzi et al. |
| 2015/0005960 A1 | 1/2015 | Endrizzi et al. |
| 2015/0005962 A1 | 1/2015 | Endrizzi et al. |
| 2015/0005963 A1 | 1/2015 | Endrizzi et al. |
| 2015/0057817 A1 | 2/2015 | Endrizzi et al. |
| 2015/0081115 A1 | 3/2015 | Endrizzi et al. |
| 2015/0081116 A1 | 3/2015 | Endrizzi et al. |
| 2015/0081118 A1 | 3/2015 | Endrizzi et al. |
| 2015/0081119 A1 | 3/2015 | Endrizzi et al. |
| 2015/0164009 A1 | 6/2015 | Chandran et al. |
| 2015/0319941 A1 | 11/2015 | Klein et al. |
| 2016/0113220 A1 | 4/2016 | Walker et al. |
| 2016/0182704 A1 | 6/2016 | Minezawa et al. |

* cited by examiner

DURATION CONTROL WITHIN IRRIGATION PROTOCOLS

CROSS-REFERENCE TO RELATED APPLICATIONS

This application claims the benefit of U.S. Provisional Patent Application No. 61/841,828, filed on Jul. 1, 2013, and U.S. Provisional Patent Application No. 61/924,154, filed on Jan. 6, 2014, which are hereby incorporated by reference herein in their entireties, including but not limited to those portions that specifically appear hereinafter, the incorporation by reference being made with the following exception: In the event that any portion of the above-referenced applications is inconsistent with this application, this application supersedes said above-referenced applications.

FEDERALLY SPONSORED RESEARCH OR DEVELOPMENT

Not Applicable.

BACKGROUND

With the increased desire for water conservation while maintaining healthy yard and crops, it has become important to use the advances in technology and communication systems to provide efficient use of water resources. Often the duration of an irrigation system is the only thing that is controllable because water pressure and flow is so consistent in modern times.

What is needed are methods, systems, and computer program implemented products for regulating the duration of the use of water in areas that are predictable and often over watered because caretakers and/or older irrigations systems are not responsive enough to effectively conserve water while maintaining aesthetically pleasing or healthy landscapes.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to methods, systems, and computer program products for optimizing water usage by controlling the duration of irrigation sessions in growing plants for yard and crops. In the following description of the disclosure, reference is made to the accompanying drawings, which form a part hereof, and in which is shown by way of illustration specific implementations in which the disclosure may be practiced. It is to be understood that other implementations may be utilized and structural changes may be made without departing from the scope of the disclosure.

Figure 1:
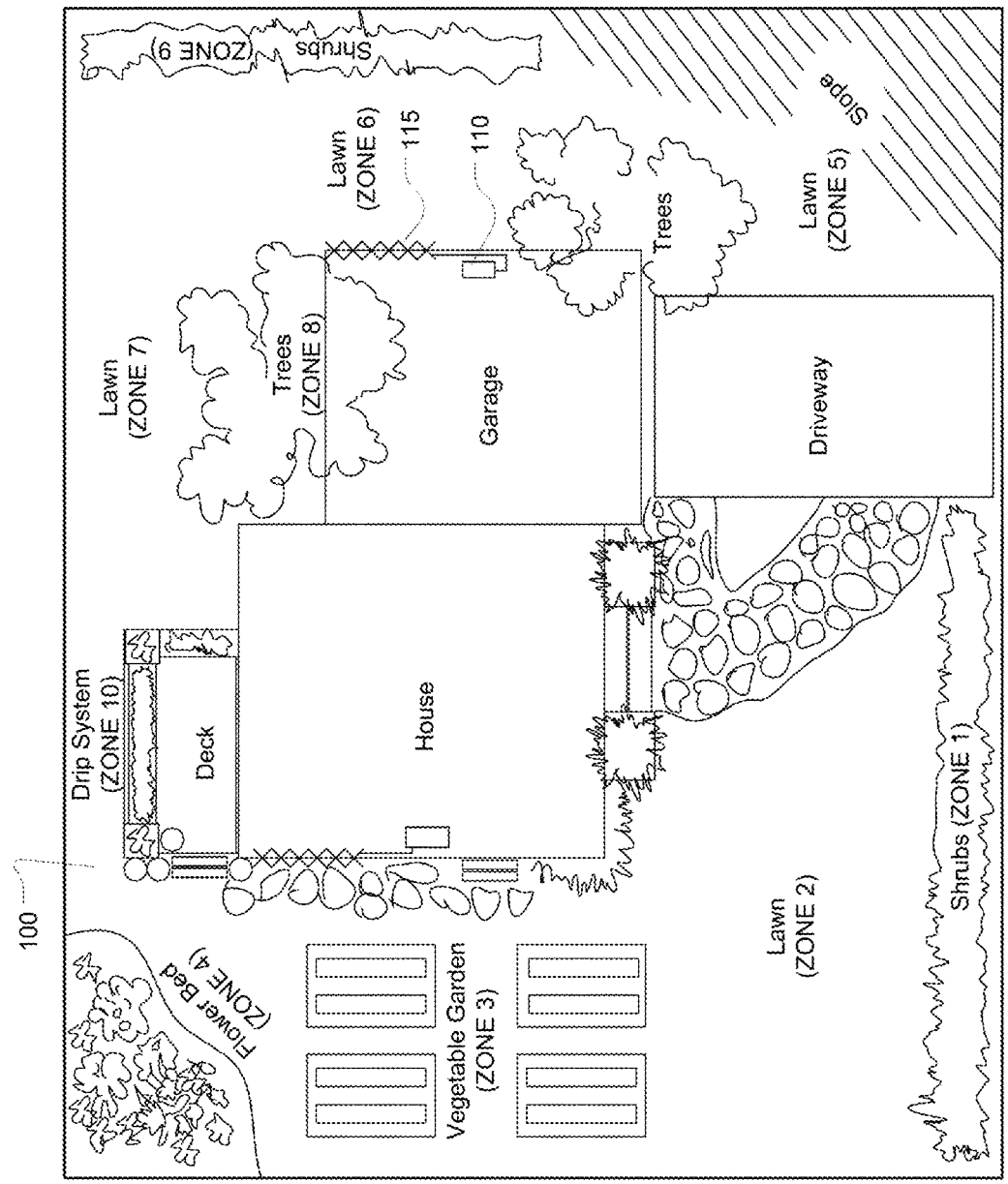
FIG. 1 illustrates an overhead view of a landscaped yard surrounding a house with a zoned irrigation system in accordance with the teachings and principles of the disclosure.

FIG. 1 illustrates an overhead view of a landscaped yard surrounding a house. As can be seen in the figure, the yard has been divided into a plurality of zones. For example, the figure is illustrated as having ten zones, but it will be appreciated that any number of zones may be implemented by the disclosure. It will be appreciated that the number of zones may be determined based on a number of factors, including soil type, plant type, slope type, area to be irrigated, etc. which will help determine the duration that needed for each zone. It will be appreciated that the number of zones that may be irrigated may be determined by the controller and its zonal capacity. For example, a controller may have a capacity of eight, meaning that the controller can optimize eight zones (i.e., Zone 1-Zone 8). However, it will be appreciated that any zonal capacity may be utilized by the disclosure.

Additionally, each zone may be irrigated with differing durations as needed by the conditions and crops within the zone. The durations may be generated within an irrigation protocol so as to compensate for differences within the irrigation plumbing if needed. For example, in an implementation the exact flow volume of the plumbing system within each zone may not be known, however the methods and systems disclosed herein will adjust the durations of irrigations sessions in accordance with query responses received from the user associated with the zones in question.

In an implementation, each zone may have different watering needs. Each zone may be associated with a certain control valve 115 that allows water into the plumbing that services each area, which corresponds to each zone. As can be seen in the figure, a zone may be a lawn area, a garden area, a tree area, a flower bed area, a shrub area, another plant type area, or any combination of the above. It will be appreciated that zones may be designated using various factors. In an implementation, zones may be designated by the amount of shade an area gets. In an implementation, zones may be defined according to soil type, amount of slope present, plant or crop type and the like. In some implementations, one or more zones may comprise drip systems, or one or more sprinkler systems, thereby providing alternative methods of delivering water to a zone.

It will be appreciated, as illustrated in FIG. 1, that a landscape may have a complex mix of zones or zone types, with each zone having separate watering needs. Many current watering systems employ a controller 110 for controlling the timing of the opening and closing of the valves within the plumbing system, such that each zone may be watered separately. These controllers 110 or control systems usually run on low voltage platforms and control solenoid type valves that are either completely open or completely closed by the actuation from a control signal. Often control systems may have a timing device to aid in the water intervals and watering times. Controllers have remained relatively simple, but as disclosed herein below in more detail, more sophisticated controllers or systems will provide optimization of the amount of water used through networked connectivity and user interaction as initiated by the system.

Figure 2:
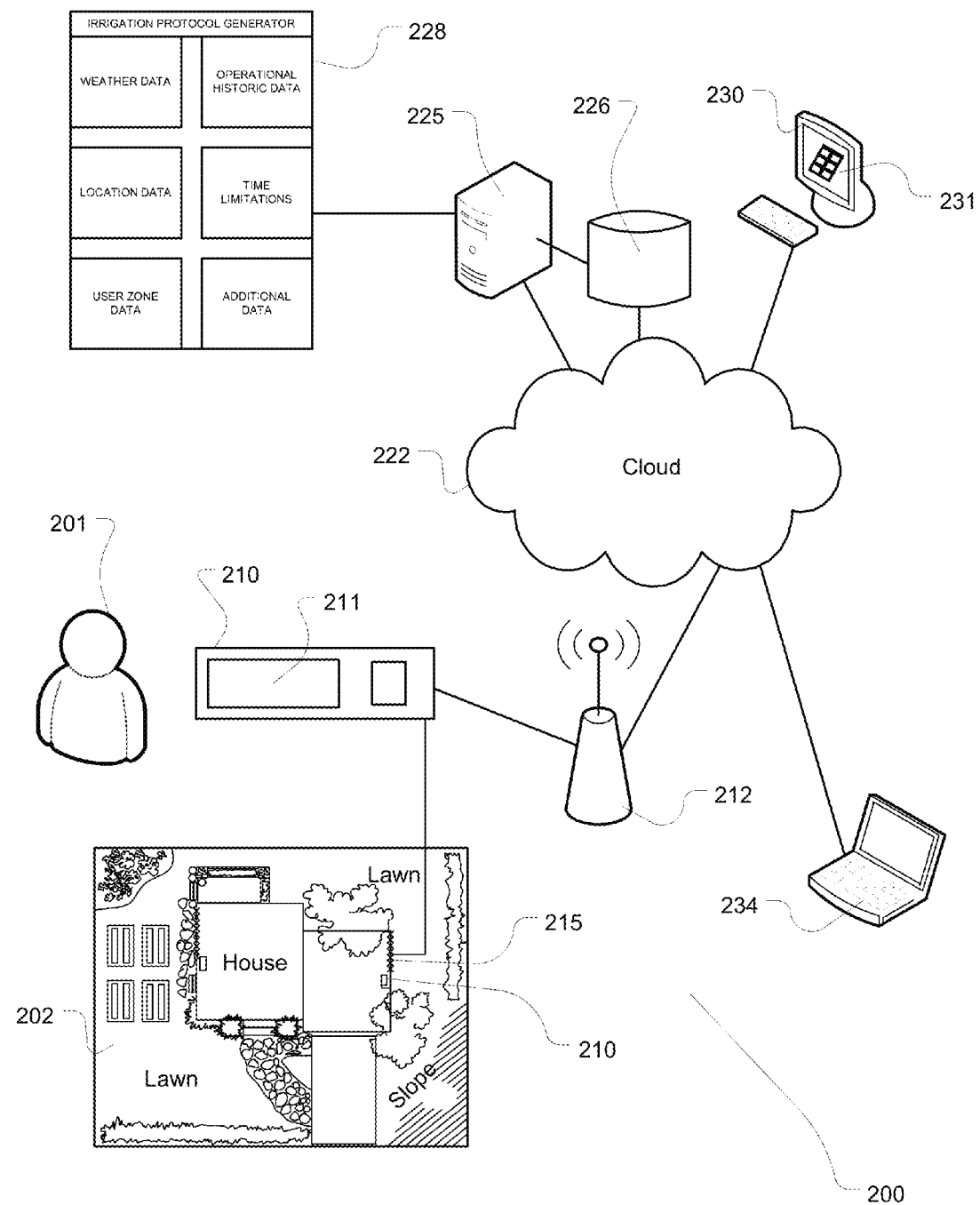
FIG. 2 illustrates a schematic diagram of an optimized irrigation control system that communicates over network in accordance with the teachings and principles of the disclosure.

FIG. 2 illustrates a schematic diagram of an optimized irrigation control system 200 that communicates over network in order to benefit from user entered and crowd sourced irrigation related data stored and accessed from a database 226. As illustrated in the figure, a system 200 for providing automated irrigation may comprise a plumbing system, such as a sprinkler system (all elements are not shown specifically, but the system is conceptualized in landscape 200), having at least one electronically actuated control valve 215. The system 200 may also comprise a controller 210 that may be electronically connected to or in electronic communication with the control valve 215. The controller 210 may have a display or control panel and an input for providing information to and receiving information from the user. The controller 210 may comprise a display or a user interface 211 for allowing a user to enter commands that control the operation of the plumbing system. The system 200 may also comprise a network interface 212 that may be in electronic communication with the controller 210. The network interface 212 may provide network 222 access to the controller 210. The system 200 may further comprise an irrigation protocol server 225 providing a web based user interface 231 on a display or computer 230. The system 200 may comprise a database 226 that may comprise data such as weather data, location data, user data, operational historical data, and other data that may be used in optimizing an irrigation protocol from an irrigation protocol generator 228.

The system 200 may further comprise a rule/protocol generator 228 using data from a plurality of databases for generating an irrigation protocol, wherein the generation of an irrigation protocol is initiated in part in response to at least an input by a user. It should be noted that the network 222 mentioned above could be a cloud computing network, and/or the internet, and/or part of a closed/private network without departing from the scope of the disclosure.

Additionally, as illustrated in FIG. 2, access may be granted to third party service providers through worker terminals 234 that may connect to the system through the network 222. The service providers may be granted pro-status on the system and may be shown more options through a user interface because of their knowledge and experience, for example, in landscaping, plumbing, and/or other experience. In an implementation, worker terminals may be a portable computing device such as portable computer, tablet, smart phone, PDA, and/or the like.

An additional feature of the system 200 may be to provide notices or notifications to users of changes that impact their irrigation protocol. For example, an implementation may provide notice to a home owner/user that its professional lawn service has made changes through a worker terminal 234. An implementation may provide a user the ability to ratify changes made by others or to reject any changes.

In an implementation, an irrigation system 200 may comprise a plurality of control valves 215, wherein each control valve corresponds to a zone of irrigation. As will be discussed in detail below, one of the advantages of the disclosed optimization system is that the flow consistency of the plumbing and control valve may be compensated for by adjusting the durations of irrigation sessions in accordance to user feedback obtained through a plurality of queries as discussed in greater detail below.

In an implementation, user communication may be facilitated through a mobile application on a mobile device configured for communicating with the irrigation protocol server 225. One or more notifications may be provided as push notifications to provide real time responsiveness from the users to the system 200.

The system 200 may further comprise an interval timer for controlling the timing of when the notifications are sent to users or customers, such that users/customers are contacted at useful intervals. For example, the system 200 may initiate contact with a user after predetermined interval of time has passed for the modifications to the irrigation protocol to take effect in the landscape, for example in plants, shrubs, grass, trees and other landscape.

In an implementation, the notifications may ask the user to provide information or indicia regarding such things as: soil type of a zone, crop type of a zone, irrigation start time, time intervals during which irrigation is occurring, the condition of each zone, or other types of information or objective indicia.

Figure 3:
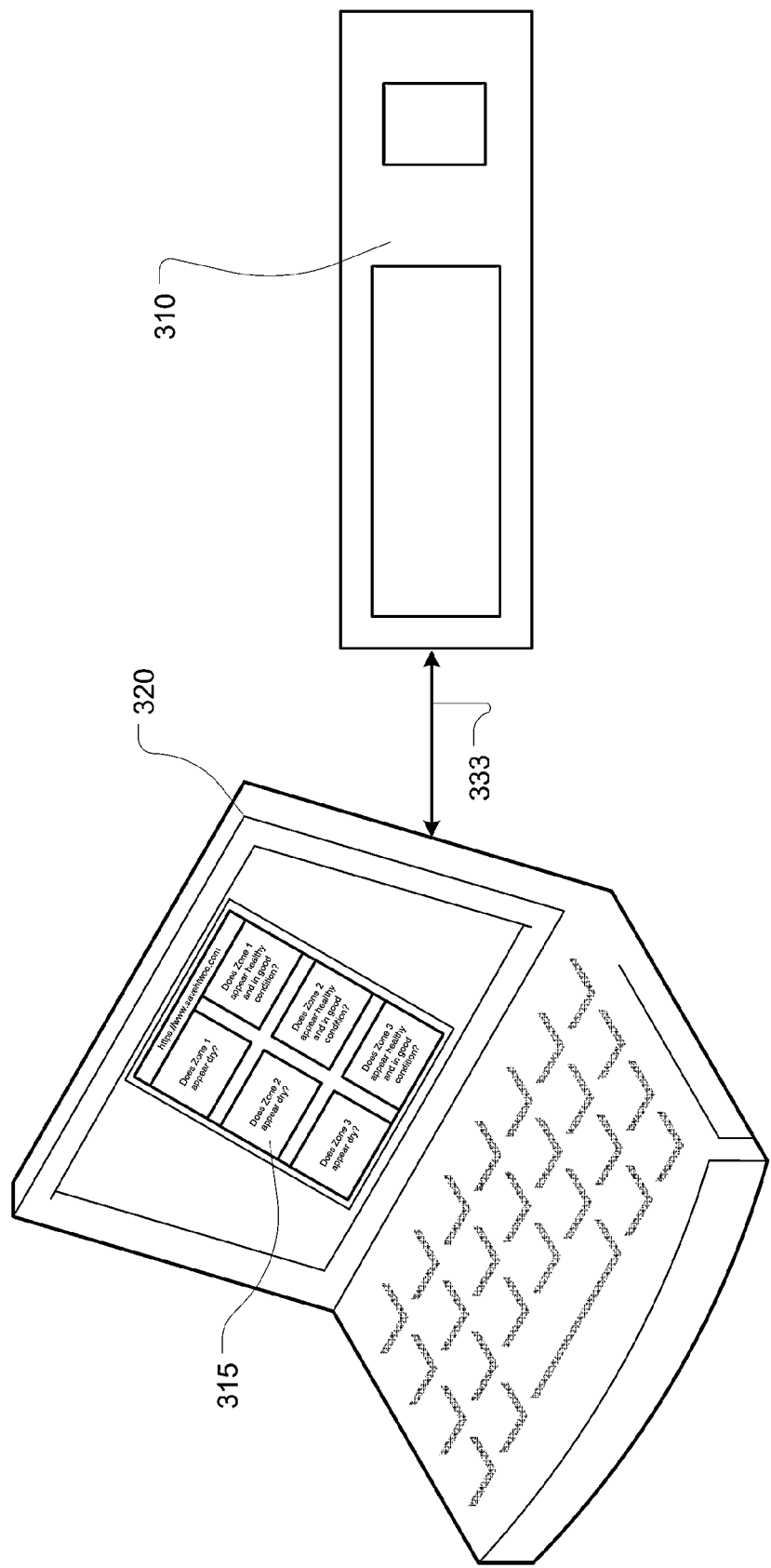
FIG. 3 illustrates a schematic diagram of a pairing between a control unit and an account in accordance with the teachings and principles of the disclosure.
Figure 4:
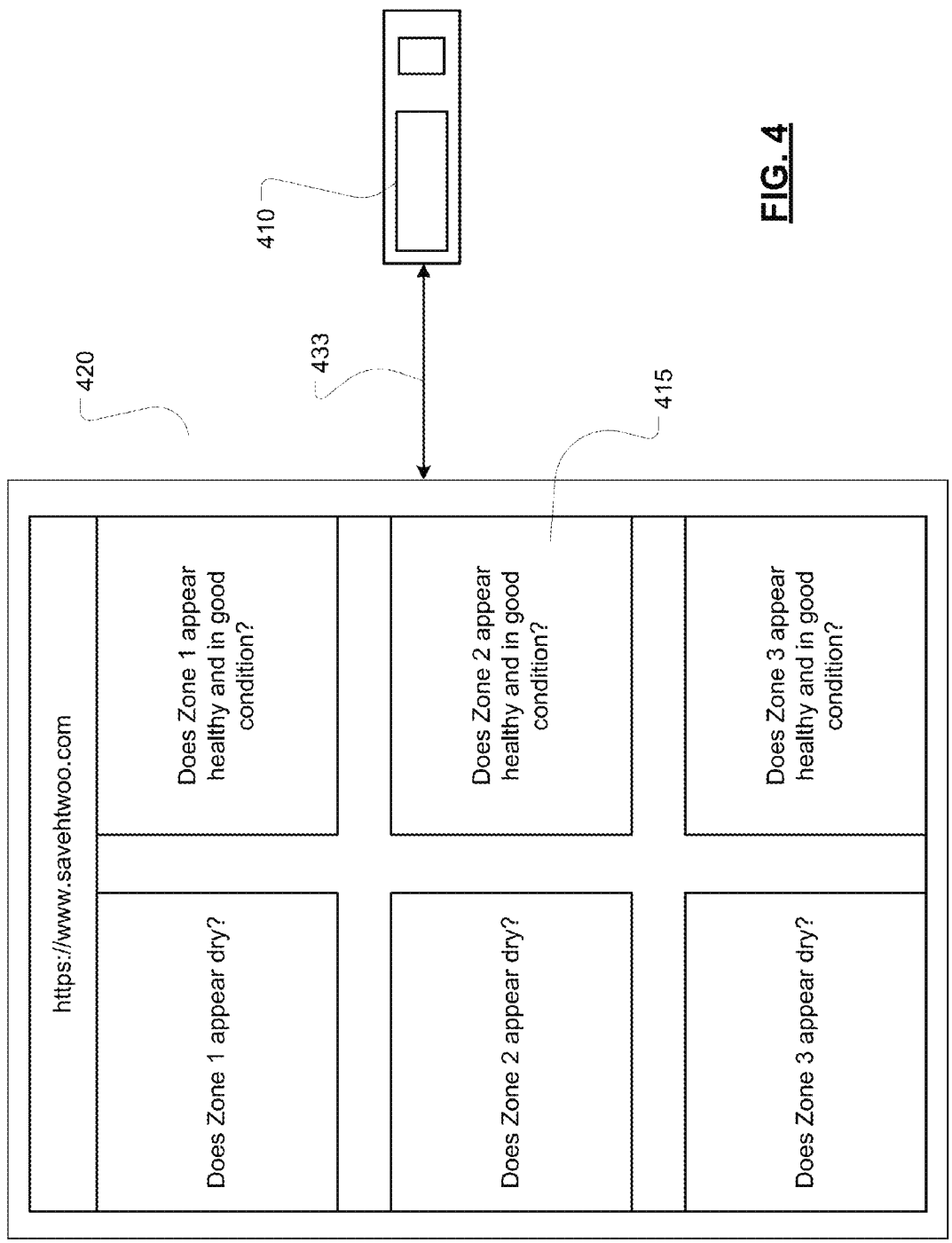
FIG. 4 illustrates a schematic diagram of a pairing between a control unit and an account in accordance with the teachings and principles of the disclosure.

Illustrated in FIGS. 3 and 4 are schematic diagrams of a pairing between a user's control unit and an account, such as a web account. In an implementation illustrated in FIG. 3, the system may comprise a pairing operation 333 between the controller 310 and a web based service in order to initiate the system 300. As is illustrated in FIG. 3, a user may electronically connect (pair) a controller 310 to an associated web account 315 viewed on a computer 320 in order to ease the collection of user data. It will be appreciated that a user would not be required to enter the desired user data through the limited input capabilities of a feasible irrigation controller 310, although it is possible for a user to enter information via the controller 310. Rather, a user/customer could conveniently enter data from a computer 320 having a web interface 315 representing a user account. A pairing operation 333 may be used to connect the web account 315 and the controller 310. Once the pairing is complete the data entered into the user account may be used to generate irrigation protocols for the controller 310 to execute. It will be appreciated that pairing process or operation 333 may involve user interaction. This user interaction may be the basis for confirming the identity of the controller 310 and the web account 315. Once pairing successfully completes, a bond will have been formed between the controller 310 and the web account 315, enabling the controller 310 and the web account 315 to connect to each other in the future without requiring the pairing process in order to confirm the identity of the devices.

Referring now to FIG. 4, there is illustrated an implementation pairing between a user's control unit and an account, such as a web account. As is illustrated in FIG. 4, a user may electronically connect (pair) a controller 410 to an associated web account 415 viewed on a computer 420 in order to ease the collection of user data. A user/customer may conveniently enter data from a computer 420 having a web interface 415 representing a user account. A pairing operation 433 may be used to connect the web account 415 and the controller 410. In an implementation, the pairing operation 433 may comprise Once the pairing is complete the data entered into the user account may be used to generate irrigation protocols for the controller 410 to execute.

In an implementation, the pairing process 333 or 433 may involve establishing a relationship between the controller 310, 410 and the account 315, 415. During the pairing process, the device(s) and the account involved establish a relationship by creating a shared secret code or a link key. If the code or link key is stored by both the device and the account they are said to be paired or bonded. A device that wants to communicate only with a bonded device can cryptographically authenticate the identity of the other device or account, and so be sure that it is the same device or account it previously paired with. Once a link key has been generated, an authenticated Asynchronous Connection-Less (ACL) link between the devices may be encrypted so that the data that they exchange over the airwaves is protected against eavesdropping.

Link keys may be deleted at any time by either the controller device or the account. If done by either the controller or the account, then such action will remove the bonding between the controller and the account. Thus, it is possible for one of the controller or the account to have a link key stored, but not be aware that it is no longer bonded to the controller or account associated with the given link key depending upon whether the link key was deleted from the controller or the account.

The paired controller and account may require either encryption or authentication, and as such require pairing before they allow a remote device to use the given service. In some implementations, the system may elect not to require encryption or authentication so that pairing does not interfere with the user experience associated with the service.

It will be appreciated that the disclosure may utilize any pairing process or mechanism that are known or that may become known without departing from the scope of the disclosure. Pairing mechanisms may include legacy pairing, secure simple pairing (SSP), or other pairing mechanisms.

The mechanism known as legacy pairing may include entering a PIN code to each device and account to be paired. Pairing may only be successful if both the device and the account (or multiple devices and the account) enter the same PIN code. It will be appreciated that any 16-byte UTF-8 string may be used as a PIN code. It will likewise be appreciated that any number of alpha-numeric characters may be used as a PIN code, e.g., 6-digit, 7-digit, 8-digit, 9-digit, 10-digit, etc., without departing from the scope of the disclosure. However, it will be appreciated that not all devices may be capable of entering all possible PIN codes. For example, limited input devices are not capable of entering PIN codes because they generally have few inputs for a user. These devices usually have a fixed PIN, for example "0000" or "1234" that are hard-coded into the device. Numeric input devices, such as a mobile phones or controllers 310, 410 may allow a user to enter a numeric value up to 16 digits in length into the device or account. Alpha-numeric input devices, such as computers, controllers 310, 410 and smartphones are examples of these devices. They allow a user to enter full UTF-8 text as a PIN code.

In an implementation of the disclosure, the pairing mechanism may be Secure Simple Pairing (SSP). Secure Simple Pairing (SSP) may use a form of public key cryptography. It will be understood that SSP does not necessarily require any user interaction. However, a device, such as controller 310, 410, may prompt the user to confirm the pairing process. Such a method may be used by devices with limited input/output capabilities, and may be more secure than the fixed PIN mechanism described above, which is typically used for legacy pairing by this set of limited devices.

SSP may use a numeric comparison as part of the pairing process. If both the device and the account have a display and at least one can accept a binary Yes/No user input, then numeric comparison may be used. This method displays a 6-digit numeric code on each device and account to be paired. The user should compare the numbers to ensure they are identical. If the comparison succeeds, then the user may confirm pairing on the device(s) and/or the account that can accept an input. This method provides some security protection, assuming the user confirms on both paired devices (or a paired device and account) and actually performs the comparison properly.

SSP may also use a passkey entry method. This method may be used between a device with a display and a device with numeric keypad entry (such as a keyboard), or two devices with numeric keypad entry. In the first case, when the controller 310, 410 is connected to the network (whether through Wi-Fi or otherwise) the controller may provide a unique identifier over a network to identify itself to the protocol server 225. The protocol server 225 may randomly generate a code using a serial generator and provide the code back to the controller 310, 410 over the network. The display of the controller 310, 410 may be used to show the code, which may be a 6-digit numeric code, to the user who then enters the code on the computing device or smartphone with a keypad or other input mechanism. In the second case, the user of each device enters the same 6-digit number. Both of these cases provide some security protection. It is to be understood that any number of alpha-numeric characters may be used as a code that may be randomly generated, e.g., 6-digit, 7-digit, 8-digit, 9-digit, 10-digit, etc., without departing from the scope of the disclosure.

It will be appreciated that any pairing mechanism may be used by the disclosure without departing from the scope of the disclosure. The above implementations are exemplary of the pairing mechanisms that may be utilized by the disclosure.

Figure 5:
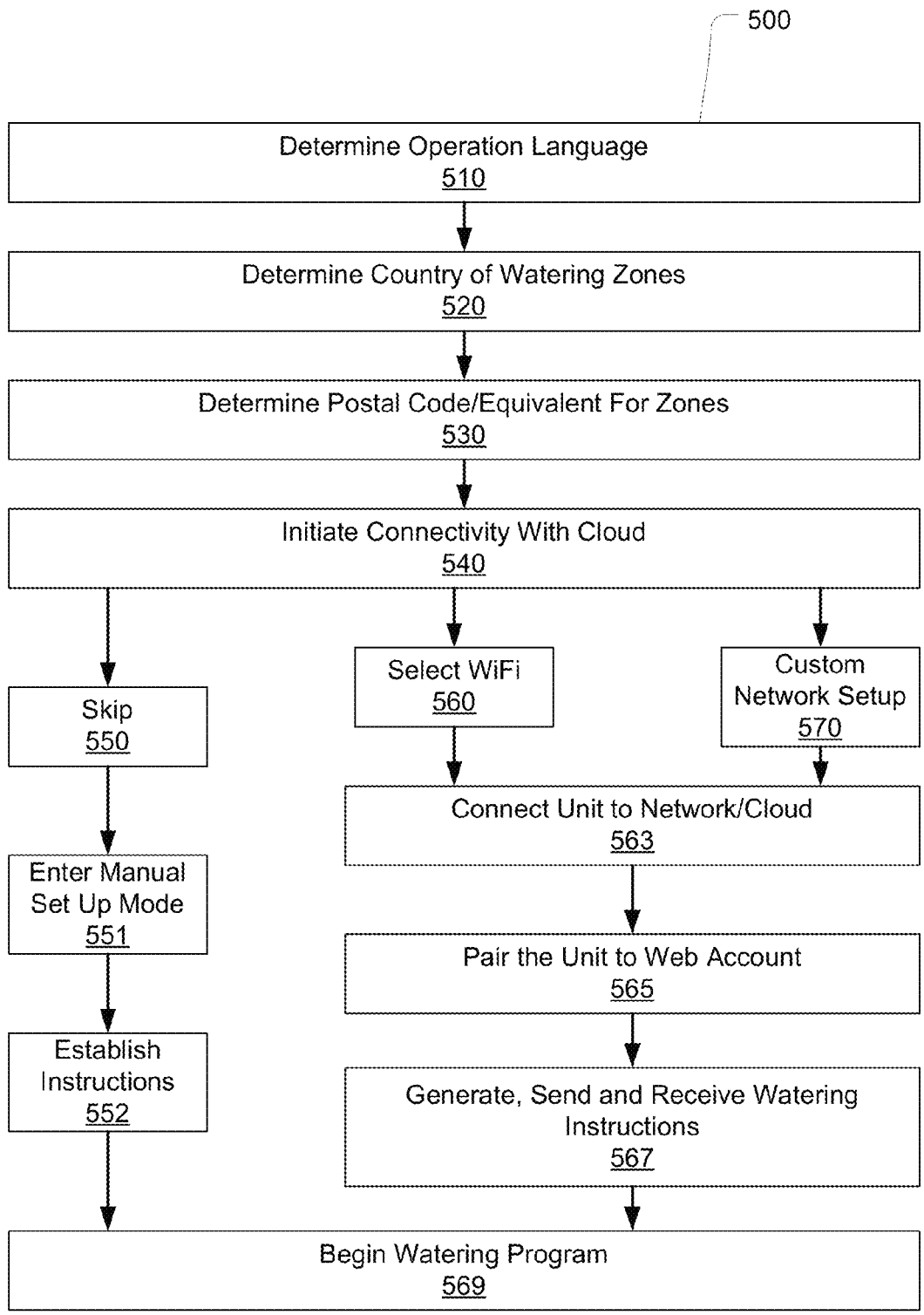
FIG. 5 illustrates a method for initiating an irrigation optimization system in accordance with the teachings and principles of the disclosure.

FIG. 5 illustrates a method 500 for initiation of an irrigation optimization system having the features of the disclosure. The method 500, may initiate at 510 by determining the language the user will use in interacting with the system. The user selection will be recorded into computer memory on the system. At 520, the geo graphical location of the user may then be determined, and at 530 the geographical location of the zones may be further refined using more specific questions about the geographical location, such as querying about a postal code or equivalent thereof in different areas of the world. Once the location has been established, the system 500 may then establish connectivity with a cloud network at 540.

At 550, the network connectivity may be skipped and at 551 a user may be asked to manually set up a watering protocol by responding to questions from the controller. At 552, a watering protocol of instructions will be generated and stored for the controllers use and at 569 the controller is ready for use and irrigation may begin automatically based on the protocol of instructions provided to the controller.

Alternatively, at 560 a user may be presented with available Wi-Fi connection options and may choose the desired connection, or at 570 a user may enter custom network settings directly. At 563, the controller or unit may be connected to the network or cloud.

Once connected to the network or cloud, at 565 the controller may be paired with an online account previously (or concurrently) set up through a web interface or other interface as seen in FIGS. 3 and 4.

Figure 8:
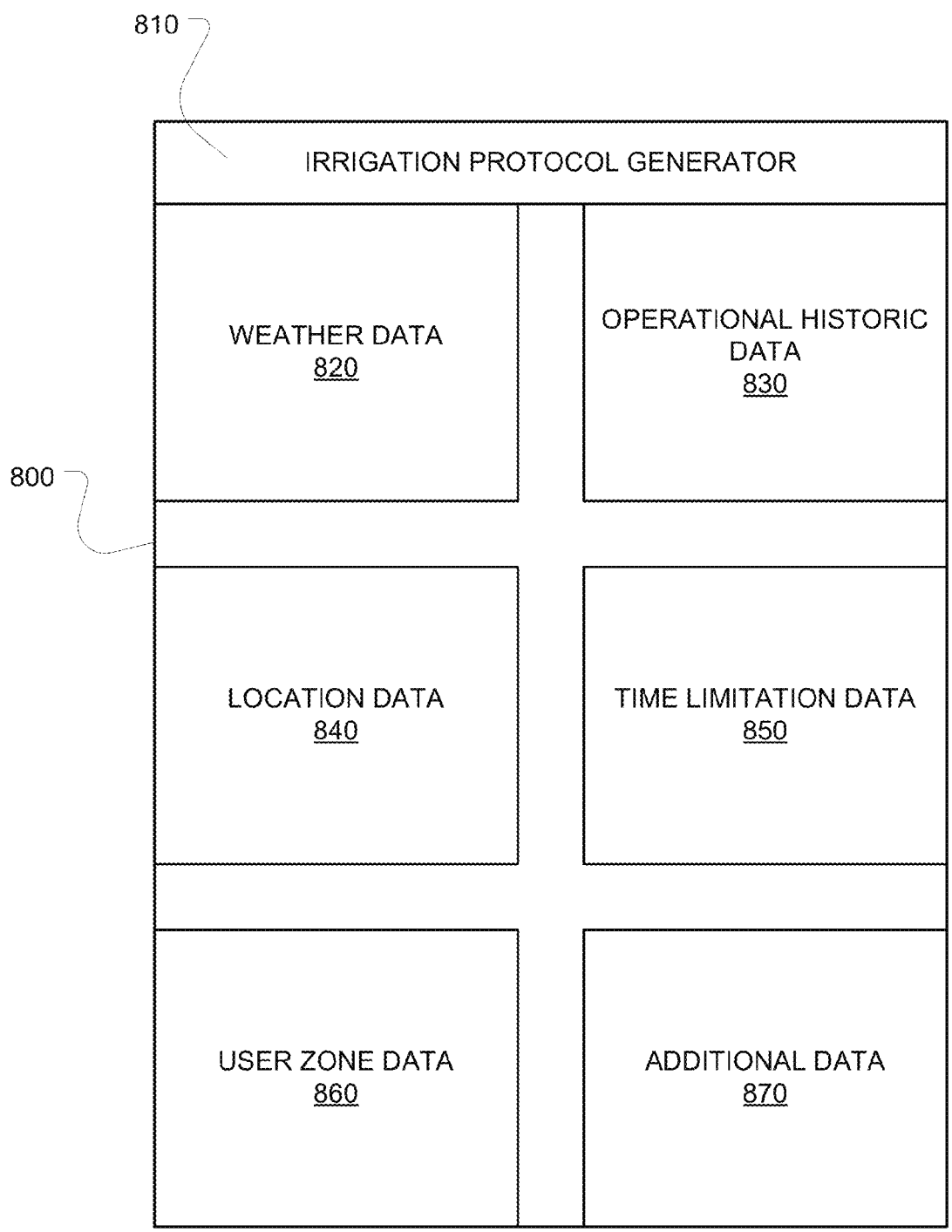
FIG. 8 illustrates a schematic diagram of a database and protocol generator in accordance with the teachings and principles of the disclosure.

At 567, a watering protocol may be generated by an irrigation protocol generator (illustrated best in FIG. 8). The protocol may be sent and transmitted through the network or cloud to the paired controller. The watering instructions or protocol may be formulated and generated, at least in part, based on user responses to queries output from the system through the web account or through the control panel user interface of the controller.

At 569, the controller is ready for use and irrigation may begin automatically based on the protocol of instructions provided to and received by the controller from the network or cloud.

Figure 6:
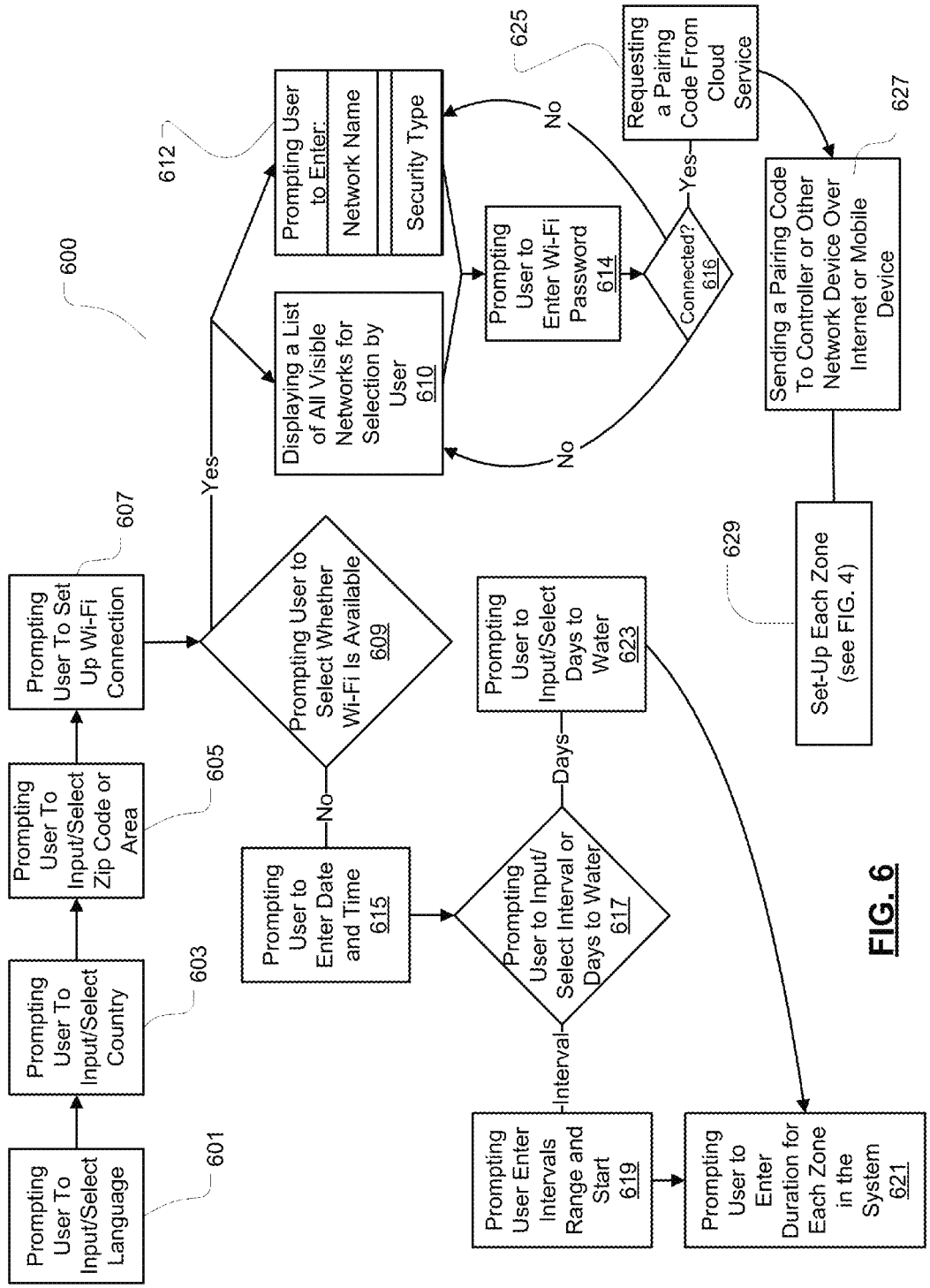
FIG. 6 illustrates a method of initiating a smart irrigation system in accordance with the teachings and principles of the disclosure.

FIG. 6 illustrates a method 600 of initiating a smart irrigation system comprising specific logic when initializing a new controller having a controller. After a controller has been wired to a plurality of control valves, the user/customer may be led through a series of queries on a control panel or user interface. In order to initialize the system, the interface may show a query about the language of communication to be used. The user may input or select the language of communication at 601. Next at 603, the user may be prompted to input or select the country in which the zones, which represent the real estate or landscape to be watered, reside. The user may be further prompted for information about its geographic location for refining the location of the zones at 605. For example, a user may be queried to input or select a zip code or other geographical area information to refine the geographical location of the watering zones.

At 607, the user may be prompted to set up a connection to a network/cloud through a Wi-Fi internet connection. At 609, the user may be prompted to input or select whether or not to connect to the network/cloud or run the irrigation system manually from the controller and control panel.

If the user decides not to connect to the network/cloud, at 615, the user will be prompted to enter data in manually, such as soil texture data, plant type data, sprinkler type data, slope type data, shade data, and duration of watering per zone. At 617, the user may be prompted to manually select or enter an irrigation interval or days to water. If the user chooses to input or enter an interval, at 619, the user will be prompted to enter the interval. Alternatively, if the user inputs or selects to irrigate according to days, at 623, the user will be prompted to enter the days for irrigation. It should be noted that in an implementation the user may be able to select both irrigation days and irrigation intervals without departing from the scope of the disclosure. Whether the user inputs or selects a watering interval or watering days or some combination thereof, at 617, the user will be prompted to input or select a duration and/or day for each of the zones controlled by the controller at 621.

At 609, if the user selected or entered that Wi-Fi is available to connect to a network then the user may be prompted to select from available networks at 610, or enter network name and security information in order to add a custom network at 612. At 614, the user may be prompted for a password. At 616, if the password fails the user will be redirected to 610 or 612 to retry the network security information or 614 to re-enter the password information. At 616, if connecting to the Wi-Fi network or internet is successful, at 625 a pairing request may be sent from the controller to a server on the network/cloud. The controller may authenticate itself with the server by providing a unique identifier to the server. The server may then receive the request from the controller. At 627, the server may then send and communicate instructions to a pairing code generator where a pairing code is generated. The pairing code may then be sent to the controller in order to pair a cloud based web account to the controller. Additionally, at 627, pairing codes may be established for a plurality of computing devices that may comprise additional controllers, control modules, mobile devices, computers, and the like. At 629, the system may set up each zone individually as shown in more detail in FIG. 7.

Figure 7:
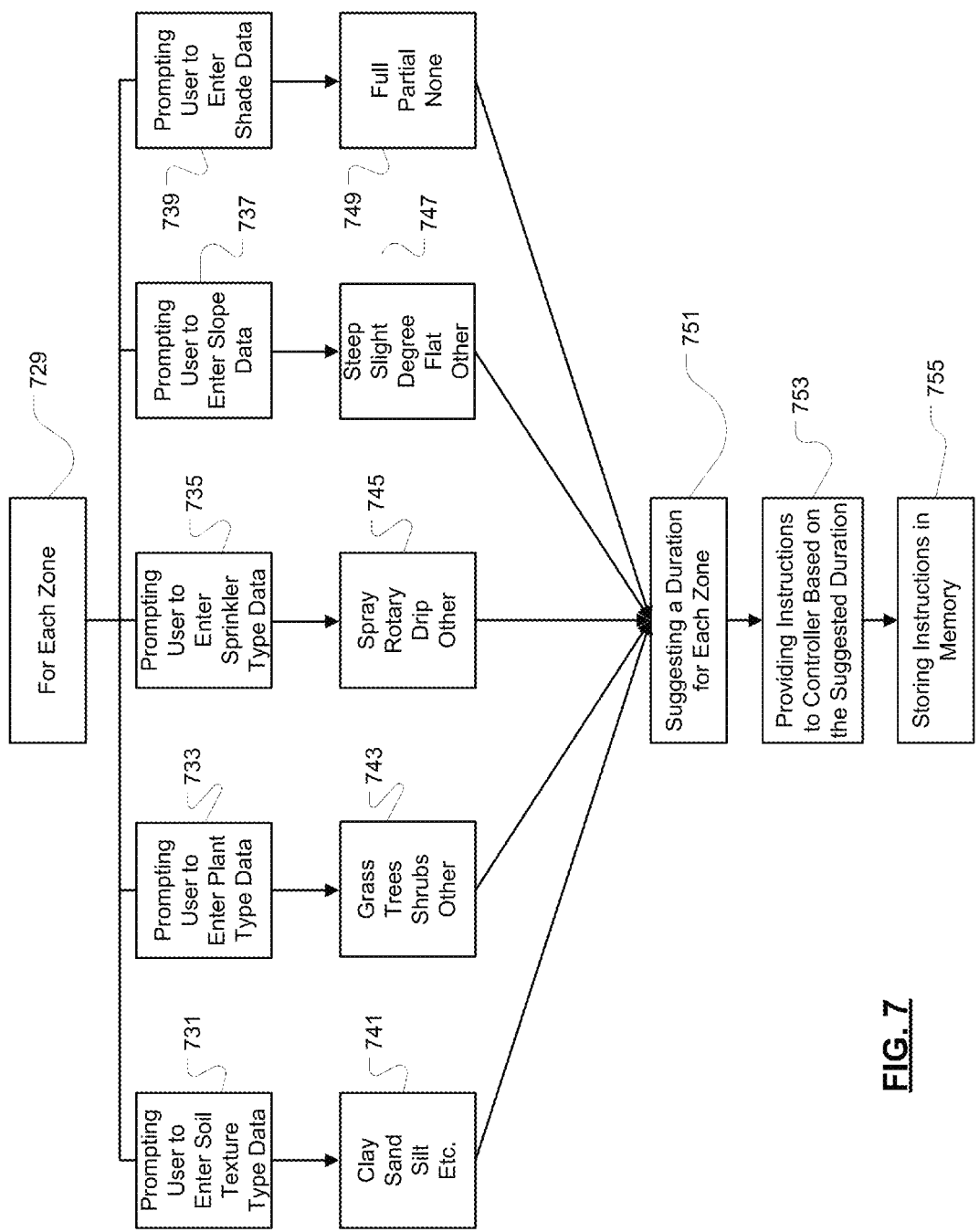
FIG. 7 illustrates a method for setting up each zone of a smart irrigation system in accordance with the teachings and principles of the disclosure.

Referring now to FIG. 7, there is illustrated a method for setting up each zone of a smart irrigation system. At 729, the system may set up each zone individually. The system may prompt the user to input or select various parameters or criteria for each zone. At 731, the system may prompt the user to input or select data relating to the soil texture type. For example, the system may ask the user to input or select clay, sand, silt, or other soil texture type at 741. At 733, the system may prompt the user to input or select data relating to the plant type. For example, at 743, the system may ask the user to input or select grass, trees, shrubs, flowers, or other plant type data in order to determine the amount of water that may be lost through evapotranspiration. At 735, the system may prompt the user to input or select data relating to the sprinkler or plumbing fixture type. For example, the system may ask the user to input or select a spray sprinkler, a rotary sprinkler, a drip system, or other sprinkler or plumbing fixture type at 745. At 737, the system may prompt the user to input or select data relating to the slope type. For example, the system may ask the user to input or select steep slope, slight slope, flat slope, or a certain degree of slope at 747. At 739, the system may prompt the user to input or select data relating to the shade type. For example, the system may ask the user to input or select full shade, partial shade, no shade, or other shade data at 749. At 751, the system utilizes the inputs and selections from the user and runs the information through a duration protocol generator to generate and suggest a protocol for watering each zone for a specified duration. At 753, the protocol or instructions may be sent to the controller. At 755, the protocol or instructions may be stored in memory in the controller for automatically initiating the irrigation system.

FIG. 8 illustrates a schematic diagram of a database 800 and protocol generator 810 in accordance with the features of the disclosure. For example, as can be seen in the figure, a database 800 may comprise weather data 820, operational historic data 830, location data 840, time limitation data 850, user zone data 860, and other data 870, such as crop or plant type data. The time and date may also be generated by a time generator and/or supplied by a database. The network or cloud may supply such data to a server or database to generate operating instructions, which in turn may be sent to the controller. In various implementations, one or more databases may be spread over a plurality of computers and computing devices that are in communication over the network. In an implementation, some data may be supplied by third party providers and may be aggregated from many sources. In an implementation, some data may be entered by users such as customers and service personnel.

It will be appreciated that implementations of the disclosure may comprise or utilize a special purpose or general-purpose computer, including computer hardware, such as, for example, one or more processors and system memory as discussed in greater detail below. Implementations within the scope of the disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice-versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data, which, when executed at a processor, cause a general purpose computer, special purpose computer, or special purpose processing device to perform a certain function or group of functions. The computer executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, commodity hardware, commodity computers, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Figure 9:
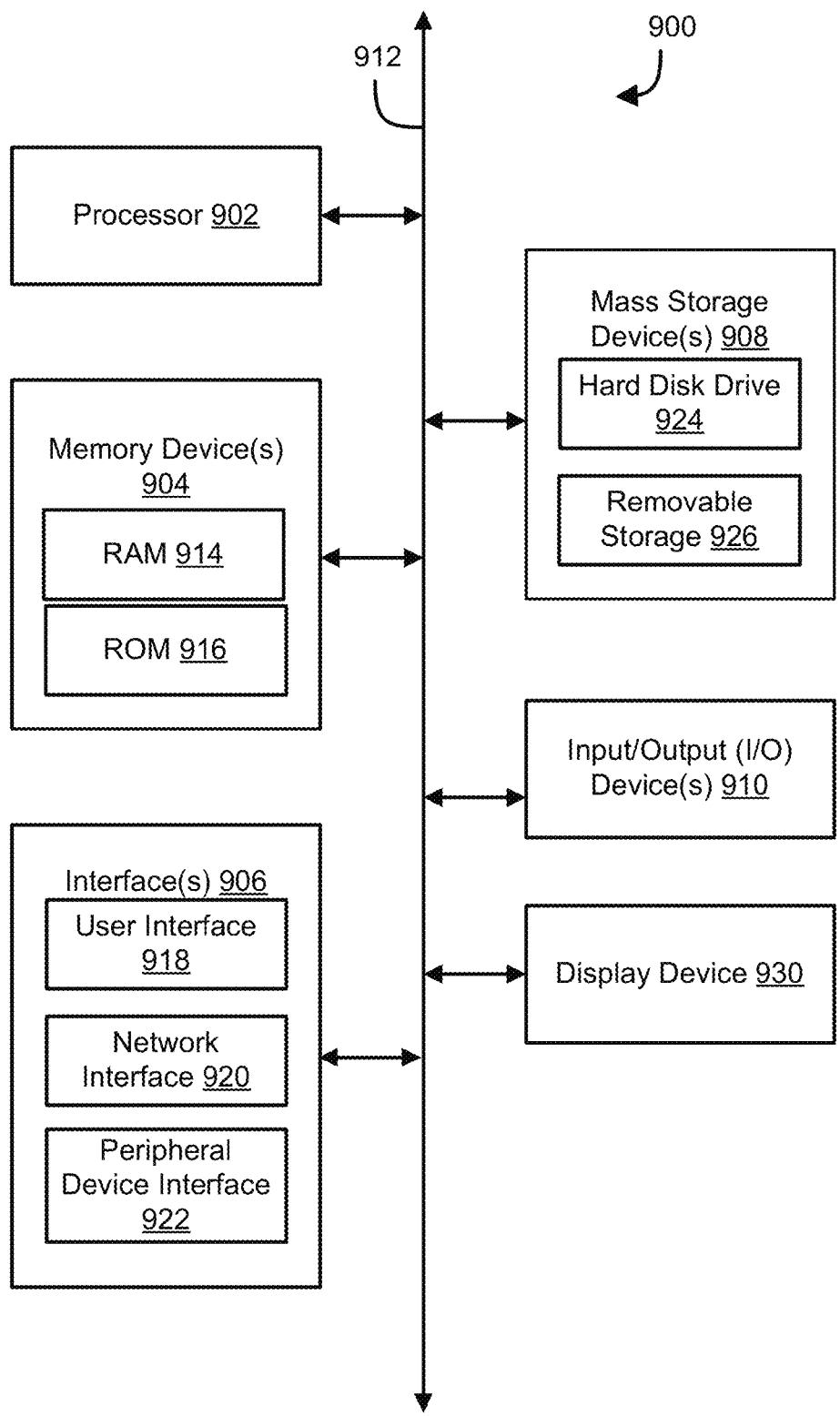
FIG. 9 illustrates a block diagram of an example computing device in accordance with the teachings and principles of the disclosure.

Referring now to FIG. 9, a block diagram of an example computing device 900 is illustrated. Computing device 900 may be used to perform various procedures, such as those discussed herein. Computing device 900 can function as a server, a client, or any other computing entity. Computing device 900 can perform various monitoring functions as discussed herein, and can execute one or more application programs, such as the application programs described herein. Computing device 900 can be any of a wide variety of computing devices, such as a desktop computer, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

Figure 10:
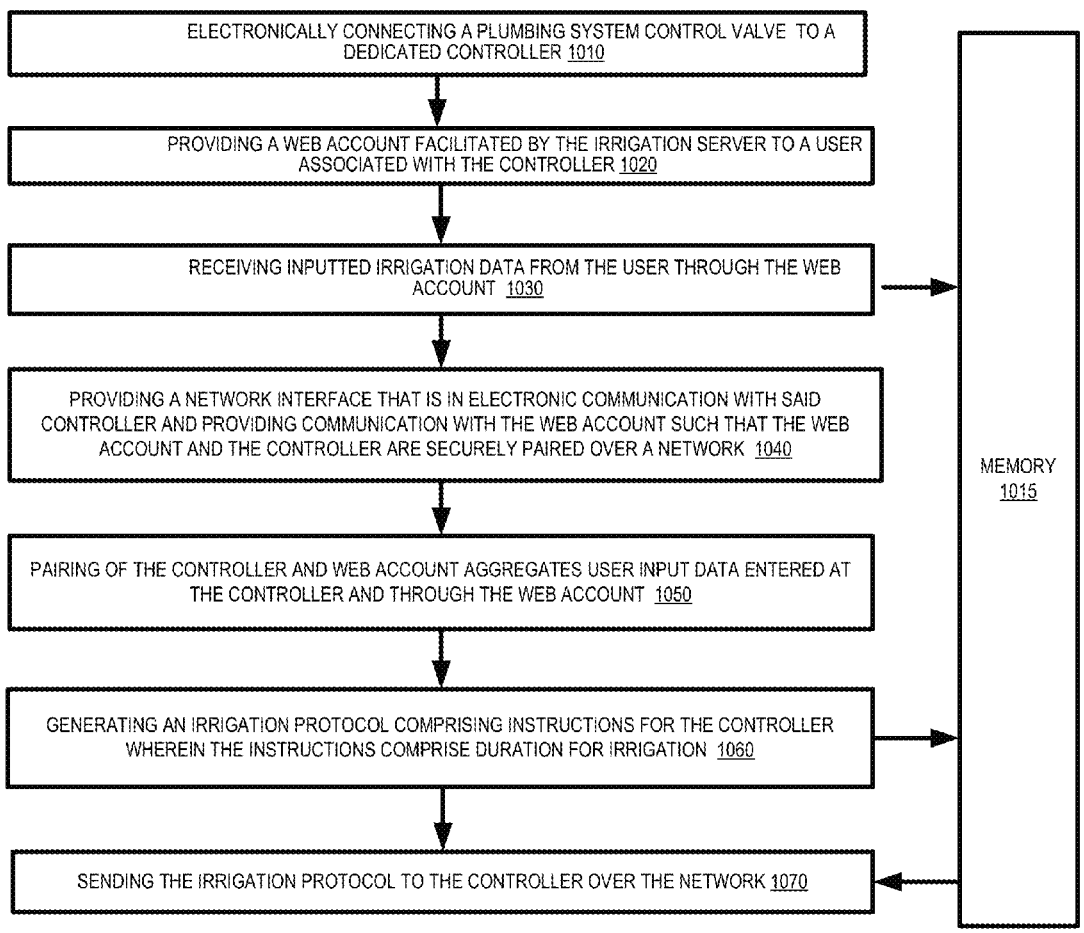
FIG. 10 illustrates a block diagram of an exemplary method for optimizing irrigation by adjusting duration in accordance with the teachings and principles of the disclosure.

Illustrated in FIG. 10 is a graphical representation of a method for providing duration optimized watering protocols. As discussed previously, in an irrigation system it may not be possible to know the precise flow of the irrigation fluid within the system. Further the flow and pressure within the system may change over time. Accordingly, to optimize an irrigation system it may be necessary to adjust the duration of irrigation systems in order to achieve the desired results of the user.

An implementation of a method for providing optimized and automated irrigation may comprise the process of electronically connecting a plumbing system having an electronically actuated control valve for controlling the flow of water through said plumbing system to a dedicated controller electronically and directly connected to said control valve and configured for sending actuation signals to the control valve thereby controlling water flow through the plumbing system at 1010. For example, a controller may be wired to a plurality of control valves such that electronic signals may be sent from the controller to the control valves within an irrigation system. Once electronic communication has been established between the controller and the control valves the duration of irrigation sessions may be controlled by the controller. In an implantation, computer readable irrigation instructions may be provided to the controller from an irrigation server comprising at least a computer processor and memory. In an implementation preliminary instructions may be provided to the controller, or previously optimized instructions may be provided to the controller over a network.

At 1020, a web account facilitated by the irrigation server may be provided to a user wherein the web account may be associated with the controller. In an implementation, a web account may be provided thereby allowing data entry by the user regarding the health of the crops within various zones.

At 1030, data such as responses to queries may be received into the system and stored in memory. As discussed above, a user may be responding to crop health queries previously sent from the system. These responses may then be stored in memory at 1015 to be used in generating an irrigation protocol that has been generated with regard to the user data inputs.

At 1040, a network interface may provide connectivity between the user account on the irrigation server and the controller. As discussed above, any suitable computer based network will suffice.

At 1050, the user account and the controller have been paired such that the irrigation server may provide relevant protocols that correspond to user inputs to the controller. In an implementation, after the pairing a user may be prompted for additional information such that the system may receive updated inputted irrigation data from the user through the web account.

At 1060, an irrigation protocol comprising instructions for the controller may be generated/derived from at least in part from the user data entered. As discussed above the primary form of the instructions is to control the duration of irrigation at a constant flow through the plumbing system. It should be noted that duration may be spread over a plurality of irrigation sessions. In some implementations the durations may be determined for a 24-hour period such that the irrigation system will irrigate for a total duration whether all in one session or split among a plurality of sessions.

Figure 12:
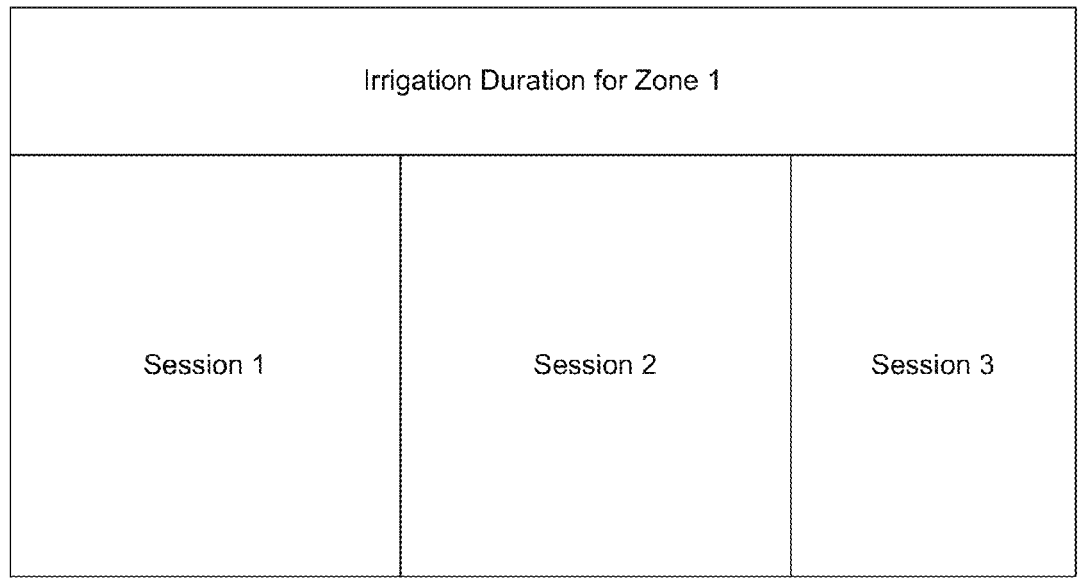
FIG. 12 is a schematic representing a duration for irrigating that may be generated and split over irrigation sessions in accordance with the teachings and principles of the disclosure.

In an implementation, the durations that are generated may be determined according to a multi-day period such that the irrigation system will irrigate for a total duration weather all in one session or split among a plurality of sessions. For example, the system may take into account restrictions imposed by municipalities, such that watering is not allowed during certain parts of the day or certain days of the week. Accordingly, the total duration may be split in order to work around the restrictive times and dates. For another example, the slope of an area may not allow the saturation needed for the soil conditions and slope. Clay, for example, has a slow absorption rate and clay if on a slope will produce more runoff than absorption. Accordingly, the protocol generator of the system may instruct the controller to water fractions of the duration in many irrigation sessions (illustrated best in FIG. 12). As can be seen in FIG. 12, the sessions having split durations may be equal as seen with sessions 1 and 2, or may be unequal as seen with sessions 2 and 3.

At 1070, an irrigation protocol may be sent to the controller over the network.

Figure 11:
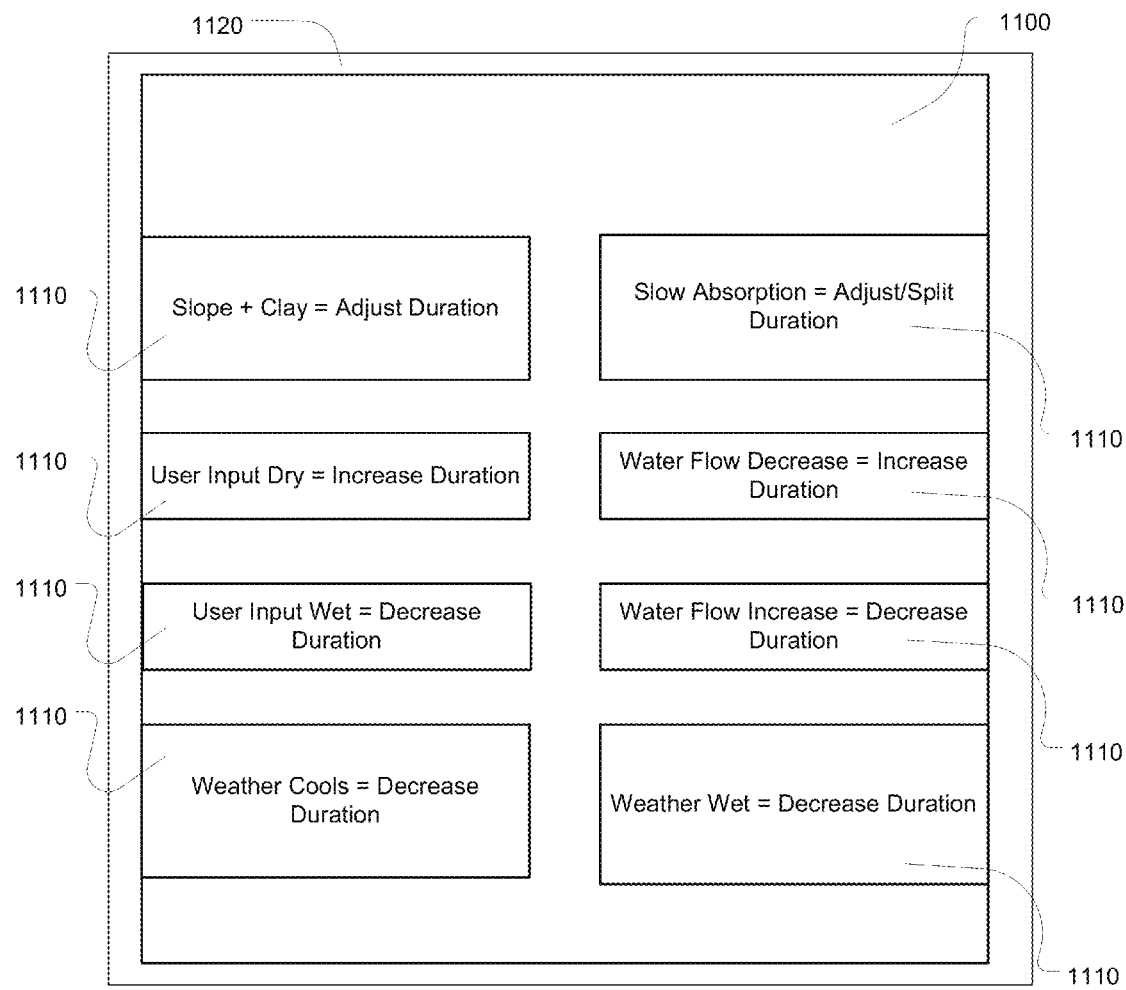
FIG. 11 is a schematic of an irrigation server in accordance with the teachings and principles of the disclosure.

Illustrated in FIG. 11 is a schematic representation of a protocol generator in accordance with the disclosure. As can be seen in the figure, the generator 1100 may comprise a plurality of algorithms 1110 that operate on the data received into the system to produce optimized watering protocols. In the present implementation, the protocol generator may reside within the irrigation server 1120.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system for providing automated irrigation comprising:
    a plumbing system having an electronically actuated control valve for controlling the flow of water through said plumbing system;
    an irrigation server comprising processors and memory for executing computing instructions;
    a web account facilitated by the irrigation server and provided to a user for receiving inputted data from the user;
    a dedicated controller electronically and directly connected to said control valve and configured for sending actuation signals to the control valve thereby controlling water flow through the plumbing system;
    wherein the controller comprises a user interface allowing a user to enter irrigation related data;
    a network interface in electronic communication with said controller and providing communication with the web account such that the web account and the controller are securely paired over a network;
    wherein the controller comprises a unique identifier, such that when an Internet connection is established the controller electronically communicates with the irrigation server by self-identification and requests a pairing code from said irrigation server;
    wherein pairing of the controller and web account aggregates user input data entered at the controller and through the web account;
    an irrigation protocol comprising instructions for the controller derived from at least weather data stored on a weather database and user input data; and
    wherein the generation of an irrigation protocol is initiated in part in response to an input by a user at either the controller or web account.

2. The system of claim 1, wherein the system further comprises a plurality of control valves wherein each control valve corresponds to an irrigation zone; wherein the system further comprises sending a plurality of pairing codes for pairing a plurality of controllers to the web account.

3. The system of claim 1, wherein the system further comprises an irrigation protocol server and a mobile application on a mobile device configured for communicating with the irrigation protocol server.

4. The system of claim 1, wherein the user irrigation data comprises a soil type of an irrigation zone.

5. The system of claim 1, wherein the user irrigation data comprises a plant type of an irrigation zone.

6. The system of claim 1, wherein the user irrigation data comprises an irrigation start time.

7. The system of claim 1, wherein the user irrigation data comprises a sprinkler type of an irrigation zone.

8. The system of claim 1, wherein the user irrigation data comprises a slope type of an irrigation zone.

9. The system of claim 1, wherein the user irrigation data comprises a shade type of an irrigation zone.

10. The system of claim 1, wherein the user irrigation data comprises an irrigation interval of time in which irrigation takes place.

11. The system of claim 1, wherein the system further comprises a predetermined interval for initiating at least one query to a user.

12. The system of claim 1, wherein the system further comprises a portal for third party landscaping service providers.

13. The system of claim 1, wherein the system prompts a user to input a language through which to communicate with the controller.

14. The system of claim 1, wherein the system prompts a user to input a geographic information where the controller and at least one irrigation zone is geographically located.

15. The system of claim 1, wherein the system prompts a user to input a zip code or other specific area location data.

16. The system of claim 1, wherein the system prompts a user to connect the controller to a network over the internet.

17. The system of claim 16, wherein the system prompts a user to input a network name and security type for a custom network.

18. The system of claim 16, wherein the system displays a list of all visible networks for selection by a user.

19. The system of claim 1, wherein the irrigation server comprises a pairing code protocol generator, wherein the irrigation server electronically communicates with the controller by receiving the request for a pairing code, wherein the pairing code protocol generator generates a pairing code and provides said pairing code to the controller.

20. The system of claim 19, wherein the user inputs the pairing code into the web account to pair said controller and said web account.

21. The system of claim 1, wherein the system prompts a user to input a date and time and further prompts the user to input one of days to run the irrigation protocol or intervals to run the irrigation protocol.

22. A method for providing automated irrigation comprising:
electronically connecting a plumbing system having an electronically actuated control valve for controlling the flow of water through said plumbing system to a dedicated controller electronically and directly connected to said control valve and configured for sending actuation signals to the control valve thereby controlling water flow through the plumbing system;
providing computer readable irrigation instructions to the controller from an irrigation server comprising at least a computer processor and memory;
providing a web account facilitated by the irrigation server to a user associated with the controller;
receiving an electronic communication from the controller comprising a unique identifier to identify the controller;
receiving a request for a pairing code from the controller;
receiving inputted irrigation data from the user through the web account; providing a network interface that is in electronic communication with said controller and providing communication with the web account such that the web account and the controller are securely paired over a network;
pairing of the controller and web account aggregates user input data entered at the controller and through the web account;
generating an irrigation protocol comprising instructions for the controller derived from at least weather data stored on a weather database and user input data;
wherein the controller controls the duration of irrigation at a constant flow through the plumbing system;
wherein the instructions for the controller consist of a duration; and
sending the irrigation protocol to the controller over the network.

23. The method of claim 22, wherein the method further comprises a plurality of control valves wherein each control valve corresponds to an irrigation zone.

24. The method of claim 23, wherein the irrigation controller instructions comprise a duration for each irrigation zone.

25. The method of claim 22, wherein the user irrigation data comprises a soil type of an irrigation zone.

26. The method of claim 22, wherein the user irrigation data comprises a plant type of an irrigation zone.

27. The method of claim 22, wherein the user irrigation data comprises an irrigation start time.

28. The method of claim 22, wherein the user irrigation data comprises a sprinkler type that is installed within an irrigation zone.

29. The method of claim 22, wherein the user irrigation data comprises a slope type of an irrigation zone.

30. The method of claim 22, wherein the user irrigation data comprises a shade type of an irrigation zone.

31. The method of claim 22, wherein the user irrigation data comprises an irrigation interval of time in which irrigation is to take place.

32. The method of claim 22, wherein the method further comprises a predetermined interval for initiating at least one query to a user.

33. The method of claim 22, wherein the method further comprises a portal for third party landscaping service providers.

34. The method of claim 22, further comprising generating a duration that is split over a plurality of irrigation sessions.

35. The method of claim 34, wherein the duration is determined for a 24 hour period.

36. The method of claim 35, wherein instructions are generated such that the irrigation system will irrigate for a total duration split among a plurality of sessions.

37. The method of claim 34, wherein the duration is generated according to a multi-day period.

38. The method of claim 37, wherein instructions are generated such that the irrigation system will irrigate for a total duration split among a plurality of sessions.

39. The method of claim 34, wherein the duration is split equally among irrigation sessions.

40. The method of claim 34, wherein the duration is split unequally among irrigation sessions.

41. A system for providing automated irrigation comprising:
a plumbing system having an electronically actuated control valve for controlling the flow of water through said plumbing system;
an irrigation server comprising processors and memory for executing computing instructions;
a web account facilitated by the irrigation server and provided to a user for receiving inputted data from the user;
a dedicated controller electronically and directly connected to said control valve and configured for sending actuation signals to the control valve thereby controlling water flow through the plumbing system;
wherein the controller comprises a user interface allowing a user to enter irrigation related data;
a network interface in electronic communication with said controller and providing communication with the web account such that the web account and the controller are securely paired over a network;
wherein the controller comprises a unique identifier, such that the controller communicates with the irrigation server by self-identification;
wherein pairing of the controller and web account aggregates user input data entered at the controller and through the web account;
an irrigation protocol comprising instructions for the controller derived from at least weather data stored on a weather database and user input data; and
wherein the generation of an irrigation protocol is initiated in part in response to an input by a user at either the controller or web account.

* * * * *